United States Patent

Kimura et al.

Patent Number: 6,064,439
Date of Patent: May 16, 2000

[54] FM TELETEXT BROADCAST RECEIVER

[75] Inventors: Tsuyoshi Kimura; Masahiko Nagata, both of Kanagawa, Japan

[73] Assignee: NEC Corporation, Tokyo, Japan

[21] Appl. No.: 08/924,259

[22] Filed: Sep. 5, 1997

[30] Foreign Application Priority Data

Sep. 9, 1996 [JP] Japan .................................. 8-238225

[51] Int. Cl.⁷ .................................................. H04N 7/087
[52] U.S. Cl. ......................... 348/468; 348/473; 348/461; 348/567
[58] Field of Search ..................... 348/468, 473, 348/476, 477, 478, 486, 460, 461, 563, 567, 553; 345/521; H04N 7/08, 7/087

[56] References Cited

U.S. PATENT DOCUMENTS

| | | | |
|---|---|---|---|
| 4,992,871 | 2/1991 | Bensch et al. | 348/468 |
| 5,353,064 | 10/1994 | Schlink | 348/468 |
| 5,410,359 | 4/1995 | Odijk et al. | 348/468 |
| 5,430,491 | 7/1995 | Park | 348/468 |
| 5,610,664 | 3/1997 | Bobert | 348/564 |
| 5,627,593 | 5/1997 | Eitz et al. | 348/466 |
| 5,635,987 | 6/1997 | Park et al. | 348/468 |
| 5,654,763 | 8/1997 | Bruckner et al. | 348/465 |
| 5,722,047 | 2/1998 | Murayama | 455/45 |
| 5,815,170 | 9/1998 | Kimura et al. | 345/521 |

FOREIGN PATENT DOCUMENTS 9-153831  6/1997  Japan .

*Primary Examiner*—John K. Peng
*Assistant Examiner*—Jean W. Désir
*Attorney, Agent, or Firm*—Whitham, Curtis & Whitham

[57] ABSTRACT

An FM teletext broadcast receiver having a page memory function of holding designed specific page data upon completion of an FM teletext broadcast program includes a data storage section. The data storage section includes a data storage area for storing received data, a state bit table for indicating the use state of each block in the data storage area, an information table for managing program data stored in the data storage area, a page memory state bit table in which a bit data value indicating whether page data in each block in the data storage area is held upon completion of a program is set and held, and a page memory information table in which table data of predetermined management items for each block in which the page data is held/set is stored. The data storage area is shared between a program data storage area and a page memory storage area to attain flexible memory allocation.

7 Claims, 11 Drawing Sheets

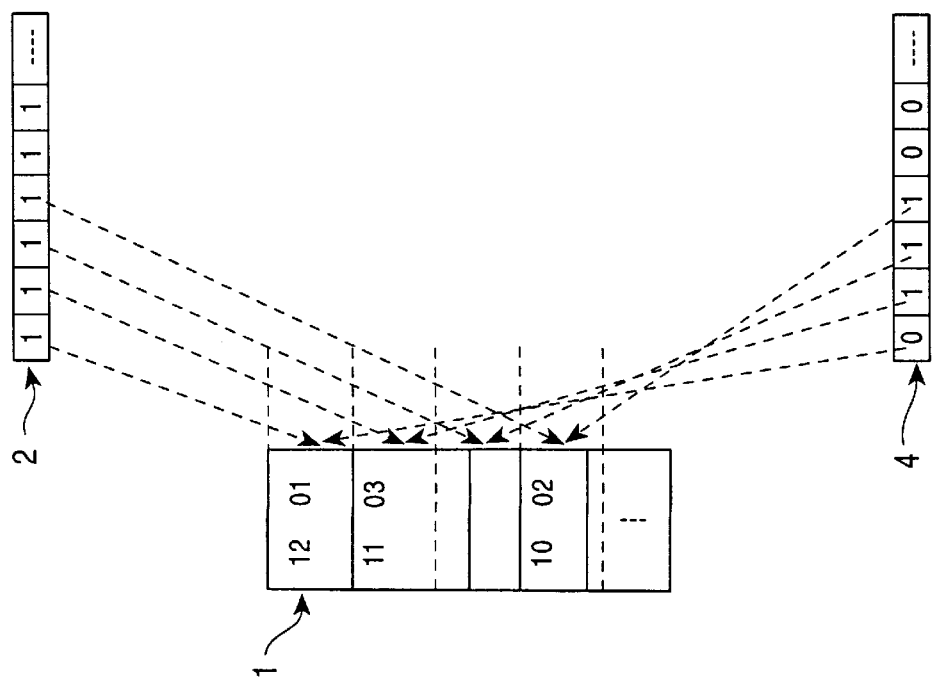

FM TELETEXT BROADCAST RECEIVER

BACKGROUND OF THE INVENTION

1. Field of the Invention

The present invention relates to a management scheme for character data in an FM teletext broadcast receiver, especially data in a page memory.

2. Description of the Prior Art

In FM teletext broadcasting, character data is broadcast by using the vertical blanking interval of a conventional FM audio broadcast television signal. On the receiver side, the received character data is decoded according to the FM multiplex broadcast standards to display the resultant data on the liquid crystal display panel shown in FIG. 1 or the like. The display panel includes a header portion for displaying 31 characters (=31 columns×1 row) in a small character size, and a text portion for displaying 30 characters (15 columns×2 rows) in a standard character size and 2 characters (1 column×2 rows) in the small character size.

FIG. 2 shows the arrangement of an FM teletext broadcast receiver. An FM signal received by an antenna (not shown) is amplified by an FM tuner 101. The audio signal is detected and amplified by an audio signal processing section (not shown) to output a sound. A data receiving section 102 extracts only character data from the FM signal. A control section 103 receives the character data from the data receiving section 102 and stores/holds it in a RAM (random access memory) 104. When the character data is to be displayed, the control section 103 loads the character data from the RAM 104 and decodes it according to the FM multiplex broadcast standards. The control section 103 loads the font data of the decoded character data from a character ROM 105, and outputs it to a display section 106, thereby displaying the character data.

The character data programs provided by FM teletext broadcasting are classified into various programs, e.g., a news program, a weather forecast program, and a traffic information program. The user can select/display each program. The character data in each program is repeatedly retransmitted (broadcast), but no retransmission cycle is specified. For this reason, if the user requests a given program, and needs to wait for the next transmission of the program, the response for display to the request becomes slow. Therefore, the character data in all the programs are preferably stored in a memory.

FIG. 3 shows the structure of page data used to display character data on an FM teletext broadcast receiver. The FM teletext broadcast receiver stores/holds data in the memory in units of pages. Each of page data 108 is constituted by packet data 107, each serving as the minimum unit in the FM teletext broadcast data structure. One page data 108 has several packet data 107. Each page data is variable-byte-length data. One packet data 107 has 22 bytes. Packet data are broadcast at a transfer rate of one packet per 18 msec.

A videotex system, an RDS (Radio Data System), and the like are similar to an FM teletext broadcast system. However, the FM teletext broadcast receiver uses a microcomputer (system control section) with a low processing speed and a small-capacity external RAM for storing data because of the small system size as compared with the videotex system. In addition, since the transfer rate of broadcast data is low, once the user misses desired data, he/she must wait for the retransmission of the data. That is, the response to a request is slow. Furthermore, in the FM teletext broadcast system, since the amount of data handled is large, the utilization efficiency of the memory for storing data must be improved to store data in the memory as much as possible, as compared with the RDS.

The first data memory management method (Japanese Unexamined Patent Publication No. HEI 9-153831) for a conventional FM teletext broadcast receiver will be described with reference to FIGS. 4A, 4B, 5, and 6. FIGS. 4A and 4B are block diagrams for explaining the data memory management method for the FM teletext broadcast receiver. A storage section is constituted by a data storage area $A_1$ which is divided into areas (to be referred to as blocks hereinafter) each consisting of a predetermined number of bytes and is used to store received character data for FM teletext broadcasting, a state bit table B in which "1" is set to indicate that data has been stored in a corresponding block of the data storage area $A_1$, and "0" is set to indicate that no data is stored in a corresponding block, and an information table C for storing program numbers, page numbers, and storage block number data to manage the types of data stored in the respective blocks.

FIG. 5 is a flow chart showing a procedure in the first data memory management method for the FM teletext broadcast receiver. FIG. 6 is a flow chart showing a data storage procedure, in which the information table C in FIG. 4B is searched to determine whether received data of a variable length byte size has already been stored in the data storage area $A_1$ in receiving FM teletext broadcast data (steps S14 and S15 in FIG. 5). If it is determined that the received data is not stored, available blocks in the data storage area are searched out on the basis of the state bit table B (steps S8 and S9 in FIG. 6) in FIG. 4A. The received data are then stored in units of blocks (step S12 in FIG. 6), and the data, in the state bit table B in FIG. 4A, which correspond to the blocks in which the data have been stored are set in a storage disabled state which indicates that data has been stored (step S13 in FIG. 6). Table data based on the received data is formed at the end of the information table C (step S17 in FIG. 5), and the data in the information table C are rearranged in a predetermined order (step S18 in FIG. 5).

The second data memory management method for a conventional FM teletext broadcast receiver to which a page memory function of holding designated specific page data upon completion of an FM teletext broadcast program is added will be described next with reference to FIGS. 7, 8A, and 8B. Referring to FIG. 7, a data storage area $A_2$ is divided into a program data storage area $A_{2-1}$ and a page memory storage area $A_{2-2}$. As the page memory storage area $A_{2-2}$, an area corresponding to the maximum necessary number of pages for a page memory is ensured. The program data storage area $A_{2-1}$ is determined by (total number of blocks in data storage area $A_2$)−(number of blocks in page memory storage area $A_{2-2}$). The state bit table B and the information table C shown in FIGS. 4A and 4B are omitted from the arrangement shown in FIG. 7.

When data is to be registered in the page memory (step S19 in FIG. 8A), table data based on the page to be stored is formed (step S20), and the page data of the page to be stored is copied from the program data storage area $A_{2-1}$ into the page memory storage area $A_{2-2}$ (step S21).

When deletion of data from the page memory is requested (step S22 in FIG. 8B), table data based on the page to be deleted is deleted from the page memory information table D, thereby deleting the page from the page memory storage area (step S23 in FIG. 8B). In this management scheme, the data storage area is divided into the program data storage area and the page memory storage area in advance in this manner.

According to the above scheme, in the FM teletext broadcast receiver having the page memory function of holding designated specific page data upon completion of an FM teletext broadcast program, when the number of pages stored in the page memory is small, in particular, the utilization efficiency of the memory greatly deteriorates because of the presence of an unused, wasteful page memory storage area.

In addition, since an area corresponding to the maximum number of pages which can be stored in the page memory must be ensured as the page memory storage area, the program data storage area undesirably decreases.

Much program data cannot therefore be stored, and the probability that program data to be displayed has been stored in the program data storage area decreases. Consequently, the program data must be received again, resulting in a decrease in display response speed.

SUMMARY OF THE INVENTION

The present invention has been made in consideration of the above situation, and has as its object to provide an FM teletext broadcast receiver which can improve the memory utilization efficiency by sharing a data storage area between a page memory storage area and a program data storage area, thereby increasing the display response speed.

In order to achieve the above object, according to the basic aspect of the present invention, there is provided an FM teletext broadcast receiver having a page memory function of holding designed specific page data upon completion of an FM teletext broadcast program, comprising data storage means including a data storage area for storing received data, a state bit table for indicating the use state of each block in the data storage area, an information table for managing program data stored in the data storage area, a page memory state bit table in which a bit data value indicating whether page data in each block in the data storage area is held upon completion of a program is set and held, and a page memory information table in which table data of predetermined management items for each block in which the page data is held/set is stored, wherein the data storage area is shared between a program data storage area and a page memory storage area to flexibly perform memory assignment.

According to the second aspect of the present invention, the FM teletext broadcast receiver in the basic aspect is characterized in that a page memory registration method includes the first step of selecting page data set as page memory data, the second step of extracting a block number indicating a block, in the data storage area, in which the page data as the page memory data is to be stored, the third step of forming table data of the page data set as the page memory data in the page memory information table, and the fourth step of setting bit data, in the page memory state bit table, which corresponds to the block in which the page data set as the page memory data is stored.

According to the third aspect of the present invention, the FM teletext broadcast receiver in the basic aspect is characterized in that a page memory deletion method includes the first step of selecting page data to be deleted from a block, in the storage area, which is set as a page memory block, the second step of deleting data of the page data to be deleted from the page memory information table, and the third step of clearing bit data, in the page memory state bit table, which corresponds to the block in which the page data to be deleted is stored.

According to the fourth aspect of the present invention, the FM teletext broadcast in the basic aspect is characterized in that the page memory state bit table comprises a bit table in which 1-bit data is set for each of the blocks, the 1-bit data being set to "0" or "1" to indicate whether a corresponding block is set as a page memory block.

According to the fifth aspect of the present invention, the FM teletext broadcast receiver in the basic aspect is characterized in that the table data in the page memory information table includes a link flag for indicating whether page data set as page memory data includes a plurality of blocks, and a block number.

According to the present invention including the above aspects, in the data memory management scheme for the FM teletext broadcast receiver, since the data storage area is shared between the program data storage area and the page memory, a large storage area for storing program data can be ensured, resulting in an improvement in the utilization efficiency of the memory. In addition, since a large storage area for storing program data can be ensured, the probability that program data to be displayed has been stored in the program data storage area is high. This eliminates a factor that deteriorates the display response characteristics. Furthermore, in normal processing, a data storage area set as a page memory cannot be used as a program data storage area. However, once a page is stored in the page memory, the same page need not be received again until the contents of the page are updated. For this reason, one data storage area can be shared between the page memory and the data storage area. Even if, therefore, the number of pages to be stored in the page memory increases, the program data storage area does not decrease, thus improving the utilization efficiency of the memory.

The above and many other objects, features and advantages of the present invention will become manifest to those skilled in the art upon making reference to the following detailed description and accompanying drawings in which preferred embodiments incorporating the principles of the present invention are shown by way of illustrative example.

BRIEF DESCRIPTION OF THE DRAWINGS

FIGS. 8A and 8B are flow charts showing procedures in the second data memory management method for the conventional FM teletext broadcast receiver, in which FIG. 8A shows a procedure for registering data in the page memory, and FIG. 8B shows a procedure for deleting data from the page memory;

FIGS. 9A to 9C are views showing a data memory map in an FM teletext broadcast receiver according to an embodiment of the present invention, in which FIG. 9A shows the arrangements of a data storage area, a state bit table, and a page memory state bit table, FIG. 9B shows the arrangement of an information table for storing program numbers, page numbers, and block numbers, and FIG. 9C shows the arrangement of a page memory information table for storing link flags and storage block numbers;

FIGS. 10A to 10C are views showing an example of the data memory management state of each block in the data memory map in FIGS. 9A to 9C;

FIGS. 11A and 11B are flow charts showing page memory management procedures for the FM teletext broadcast receiver according to the embodiment, in which FIG. 11A shows a page memory registration procedure, and FIG. 11B shows a page memory deletion procedure.

DETAILED DESCRIPTION OF THE PREFERRED EMBODIMENT

A preferred embodiment of the present invention will be described below with reference to the accompanying drawings.

Figure 1:
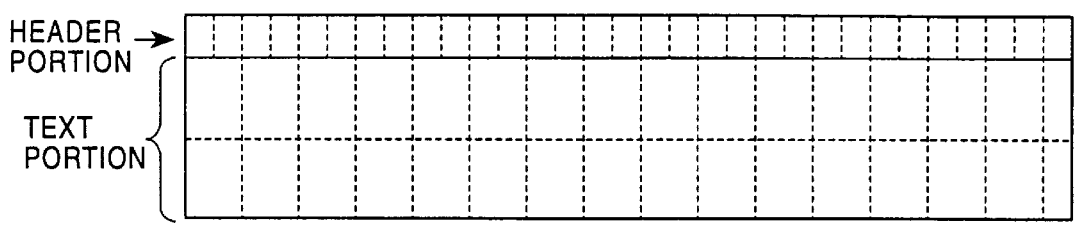
FIG. 1 is a view showing the screen arrangement of a conventional, general FM teletext broadcast receiver.
Figure 2:
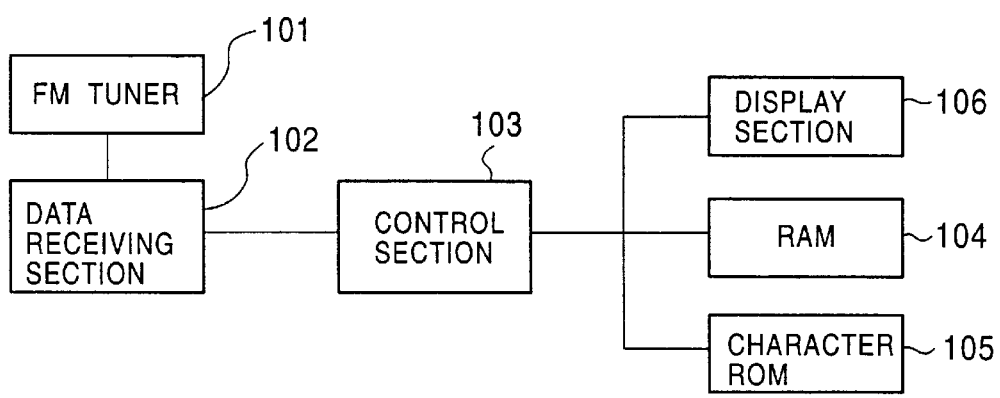
FIG. 2 is a block diagram showing the arrangement of a conventional FM teletext broadcast receiver.
Figure 3:
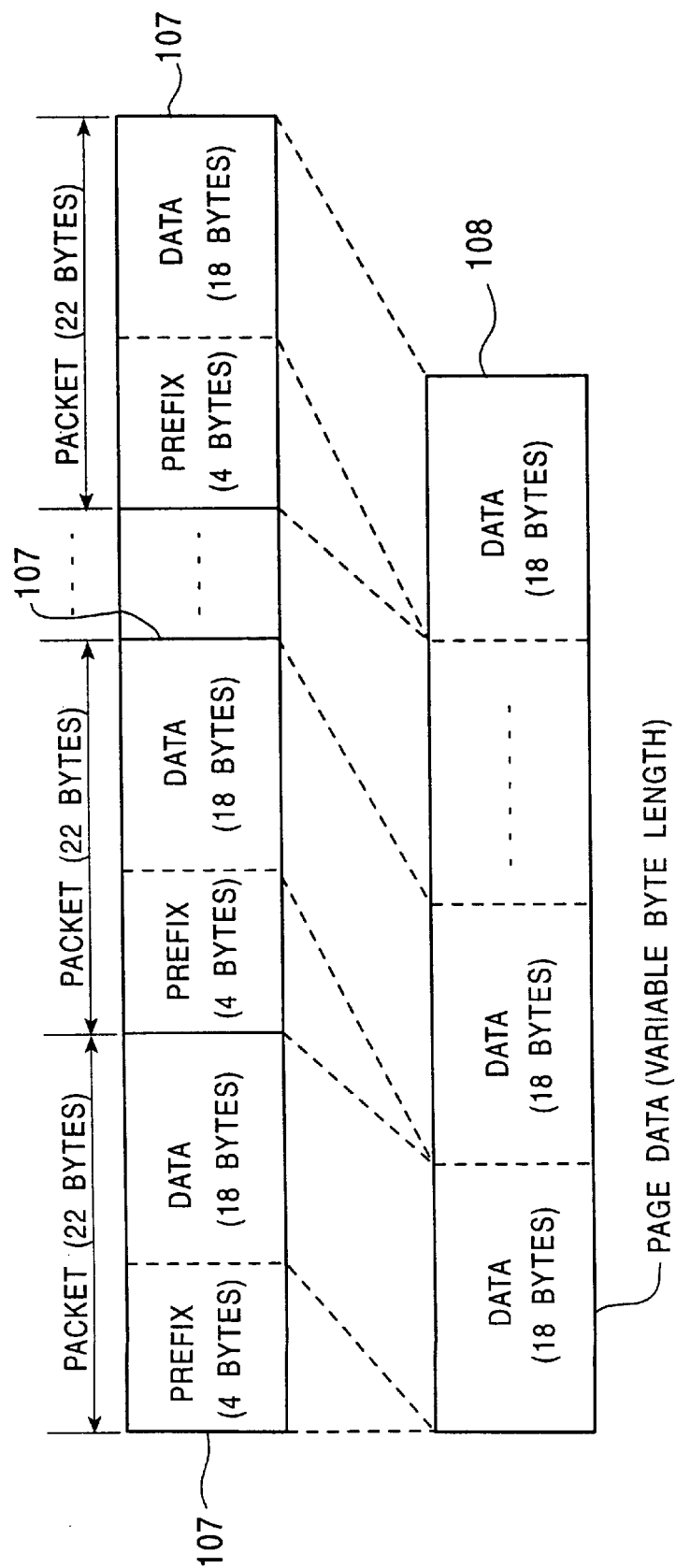
FIG. 3 is a view showing a page data structure in the conventional FM teletext broadcast receiver.
Figures 4A, 4B:
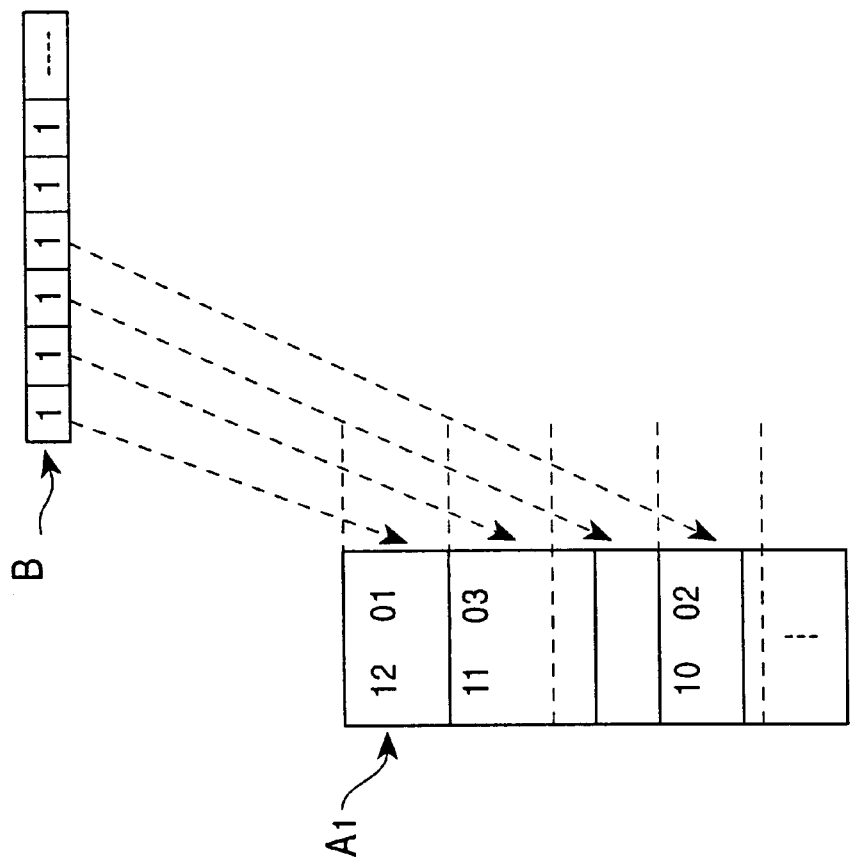
FIGS. 4A and 4B are block diagrams showing the first data memory management method for a conventional FM teletext broadcast receiver, in which reference symbols $A_1$ and B in FIG. 4A respectively denote a data storage area and a state bit table, and reference symbol C in FIG. 4B denotes an information table for storing program numbers, page numbers, and storage block numbers.
Figure 5:
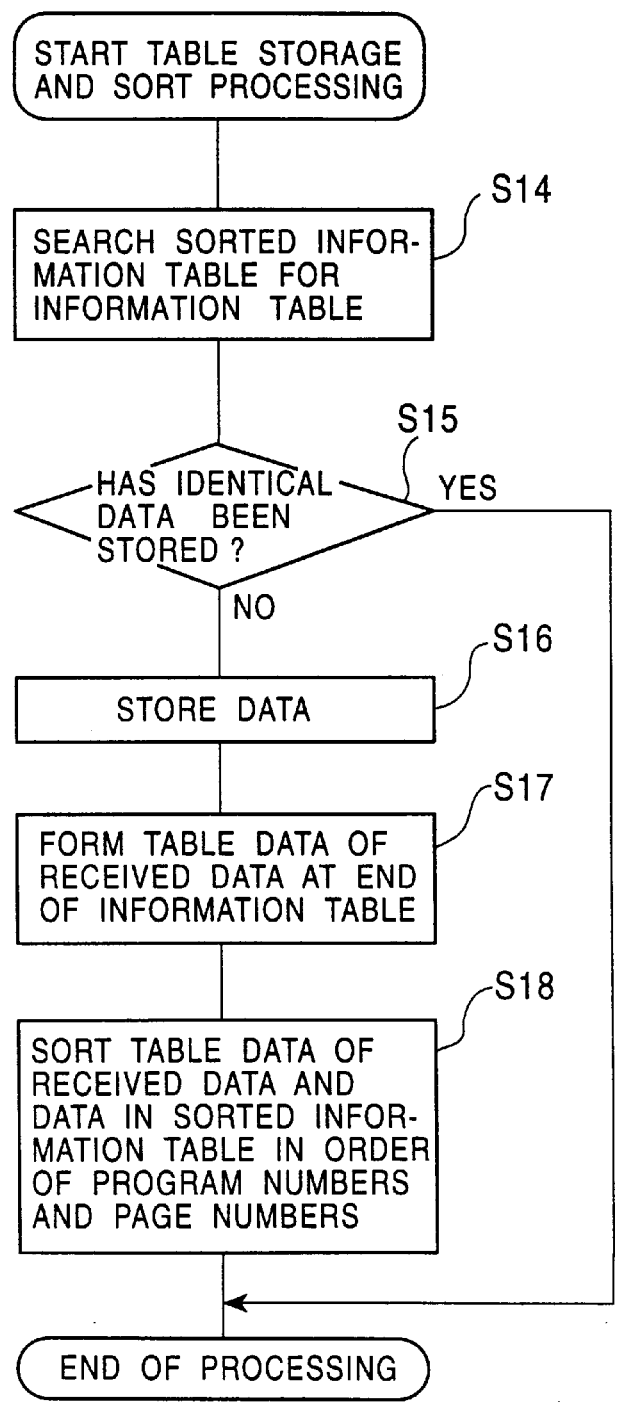
FIG. 5 is a flow chart showing a procedure in the first data memory management method for the conventional FM teletext broadcast receiver.
Figure 6:
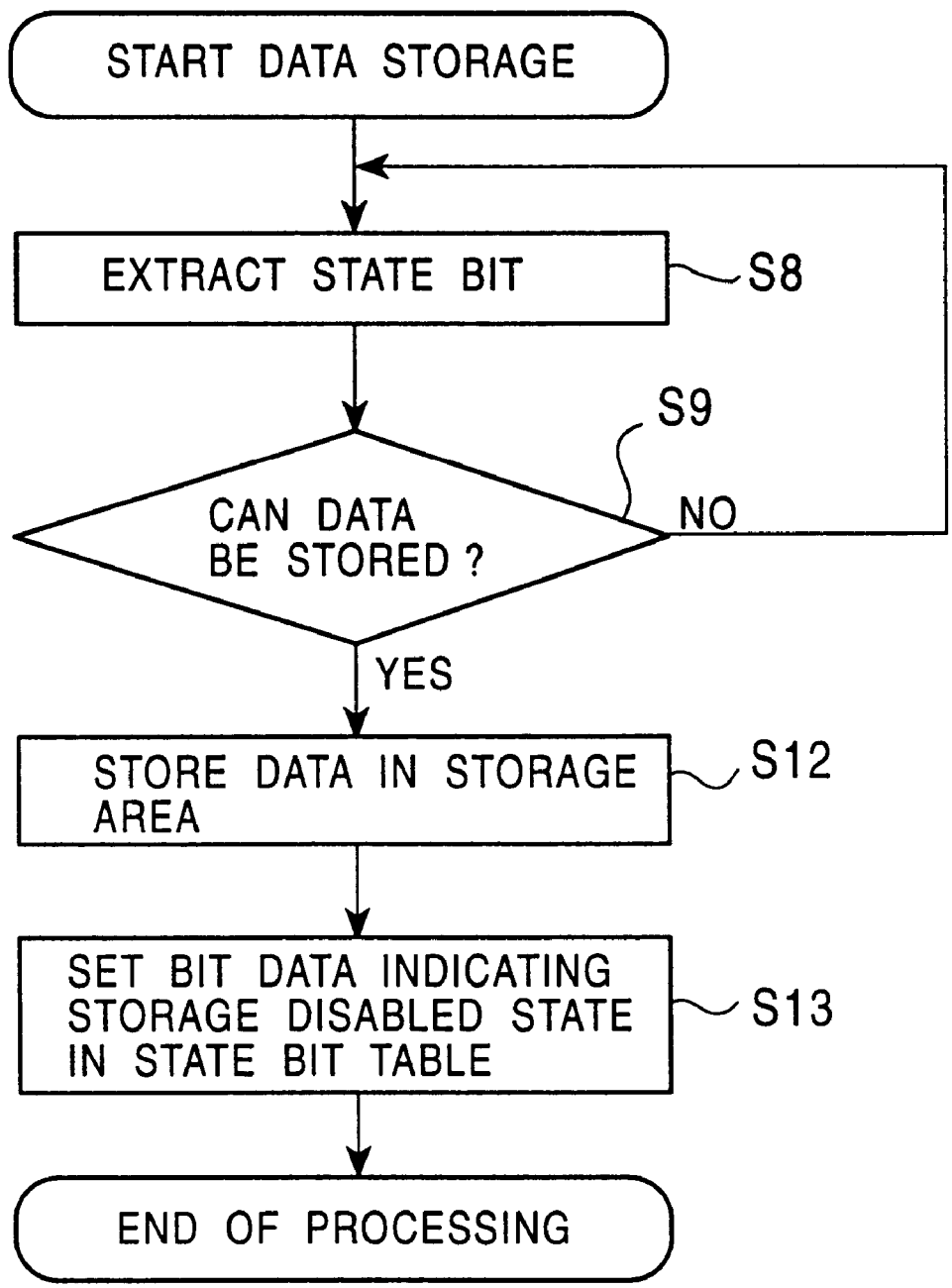
FIG. 6 is a flow chart showing a procedure in the first data storage processing method for the conventional FM teletext broadcast receiver.
Figure 7:
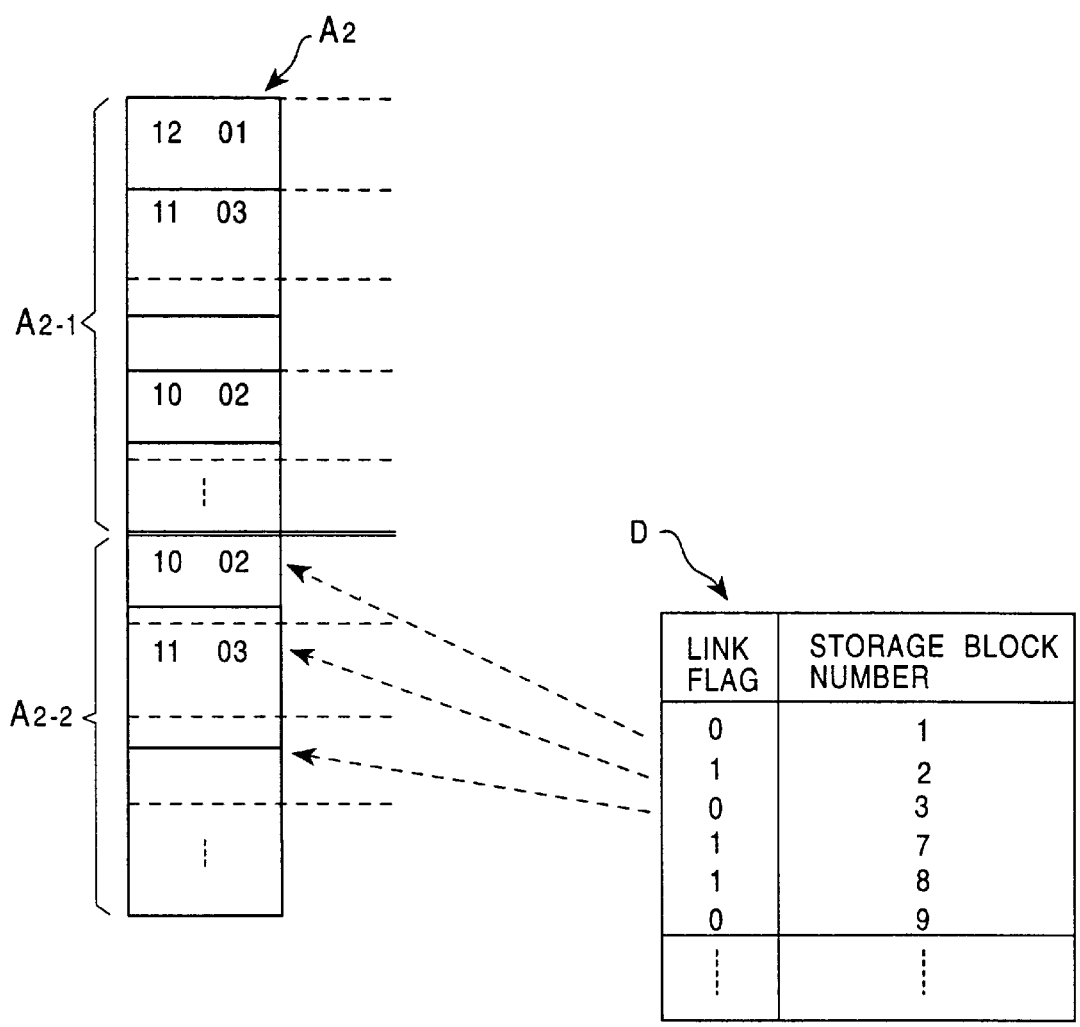
FIG. 7 is a block diagram showing the second data memory management method for the conventional FM teletext broadcast receiver, in which reference symbols $A_2$ and D respectively denote a data storage area and a page memory information table.
Figure 8B:
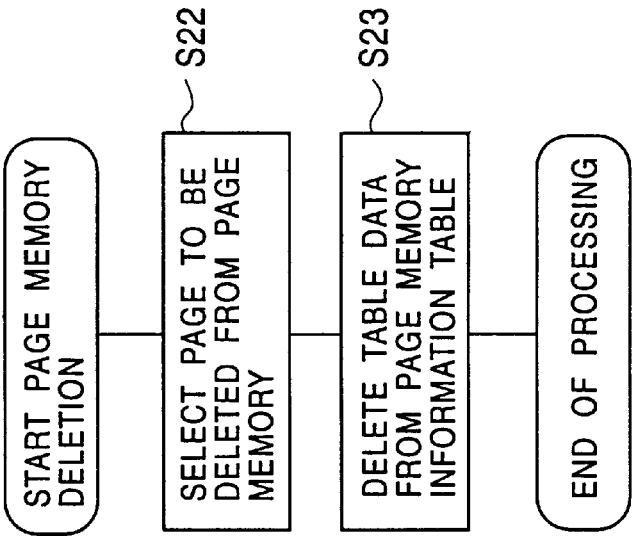
Figure 8A:
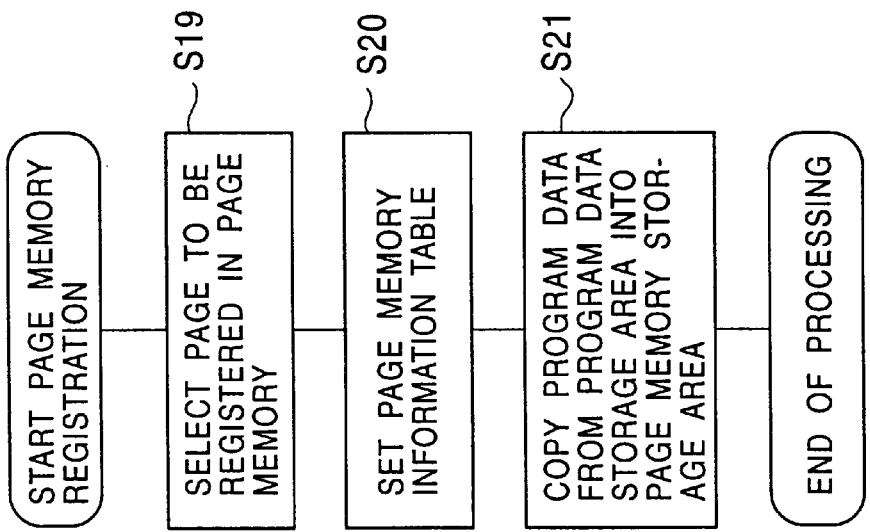
Figure 9B:
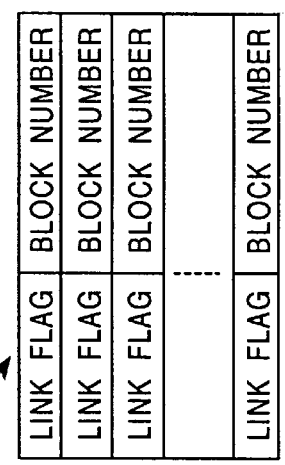
Figure 9C:
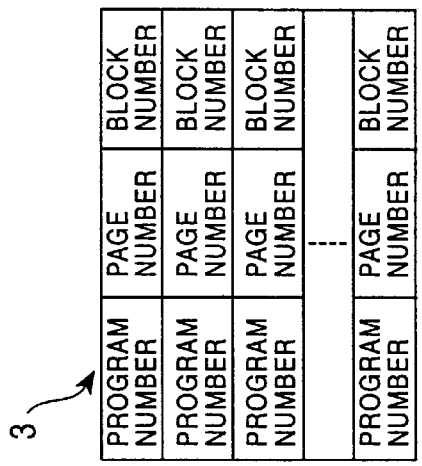
Figure 9A:
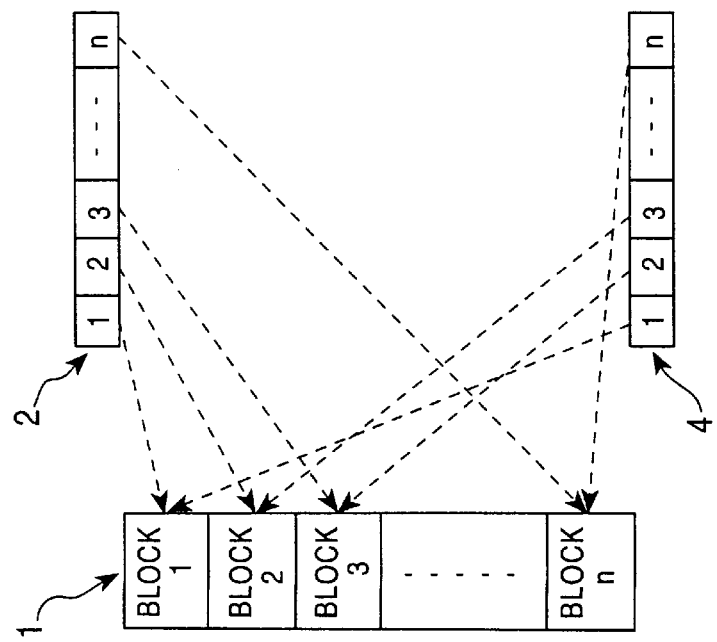

FIGS. 9A to 9C are block diagrams showing a data memory map in an FM teletext broadcast receiver according to an embodiment of the present invention. FIGS. 10A to 10C show an example of the data memory management state of each block in the page memory map in FIGS. 9A to 9C. This receiver has a page memory function of holding page data that is currently seen when the user operates the receiver, and allowing the user to see the held page data any time he/she wants even after an FM teletext broadcast program is complete and the receiver is powered off (power is kept supplied to the IC memory in which the program data is stored), or the FM reception frequency is changed.

Referring to FIGS. 9A to 10C, reference numeral 1 denotes a data storage area for storing received FM teletext broadcast character data. The data storage area 1 is divided into areas (to be referred to as blocks hereinafter) each consisting of a predetermined number of bytes. The same data storage area is shared between a program data memory and a page data memory. Reference numeral 2 denotes a state bit table, in which "1" is set to indicate that data has been stored in a corresponding block in the data storage area 1, and "0" is set to indicate that a corresponding block is available. Such 1-bit data "1" or "0" is set for each block. Reference numeral 3 denotes an information table in which program numbers, page numbers, and storage block numbers are stored to manage the program data stored in the respective blocks; and 4, a page memory information bit table in which "1" is set to indicate that data is stored in a corresponding block serving as a page memory block in the data storage area 1, and "0" is set to indicate that no data is stored in a corresponding block. Such 1-bit data "1" or "0" is set for each block. Reference numeral 5 denotes a page memory information table for managing page data set as page memory data.

The page memory information table 5 is constituted by link flags each indicating whether page data set as page memory data includes a plurality of blocks, and storage block numbers indicating the addresses of page data set as page memory data in the data storage area 1. When page data set as page memory data includes more than one block, table data corresponding to the number of blocks in which the page data is stored is set in the page memory information table 5.

In the page memory information table 5, for example, the data denoted by reference numeral 501 in FIG. 10C are consecutively set. Each of the link flags corresponding to the first data of the consecutive table data to the data immediately preceding the last data (54 and 55 in FIG. 10C) is set to "1" to indicate that the next table data belonging to the same page. The link data corresponding to the last table data (56 in FIG. 10C) is cleared to "0".

Each storage block number in the page memory information table 5 indicates the block number, in the data storage area 1, in which corresponding data is stored. Storage block number "1" indicates "11" in the data storage area 1 in FIG. 10A. Similarly, storage block number "2" indicates "12" in the data storage area 1. The number of blocks that can be set as page memory blocks depends on the number of table data that can be used by the page memory information table 5. One block corresponds to one table data. The number of blocks that can be used to store program data is (total number of blocks of data storage area 1)−(number of blocks set as page memory blocks). If, for example, the total number of blocks of the data storage area 1 is 1,000, and the number of blocks set as page memory blocks is 200 (a 200-page page memory can be set when one page corresponds to one block), 800 blocks can be used as blocks for storing program data. When no blocks are set as page memory blocks, 1,000 blocks can be used to store program data.

Figure 11B:
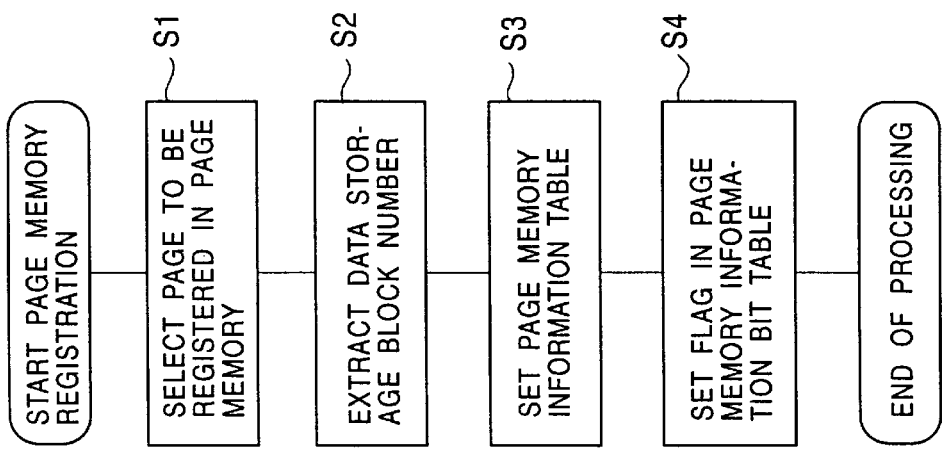
Figure 11A:
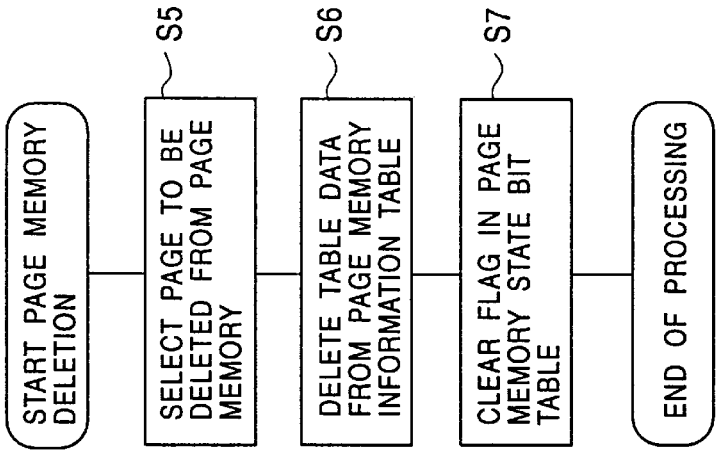
Figure 12:
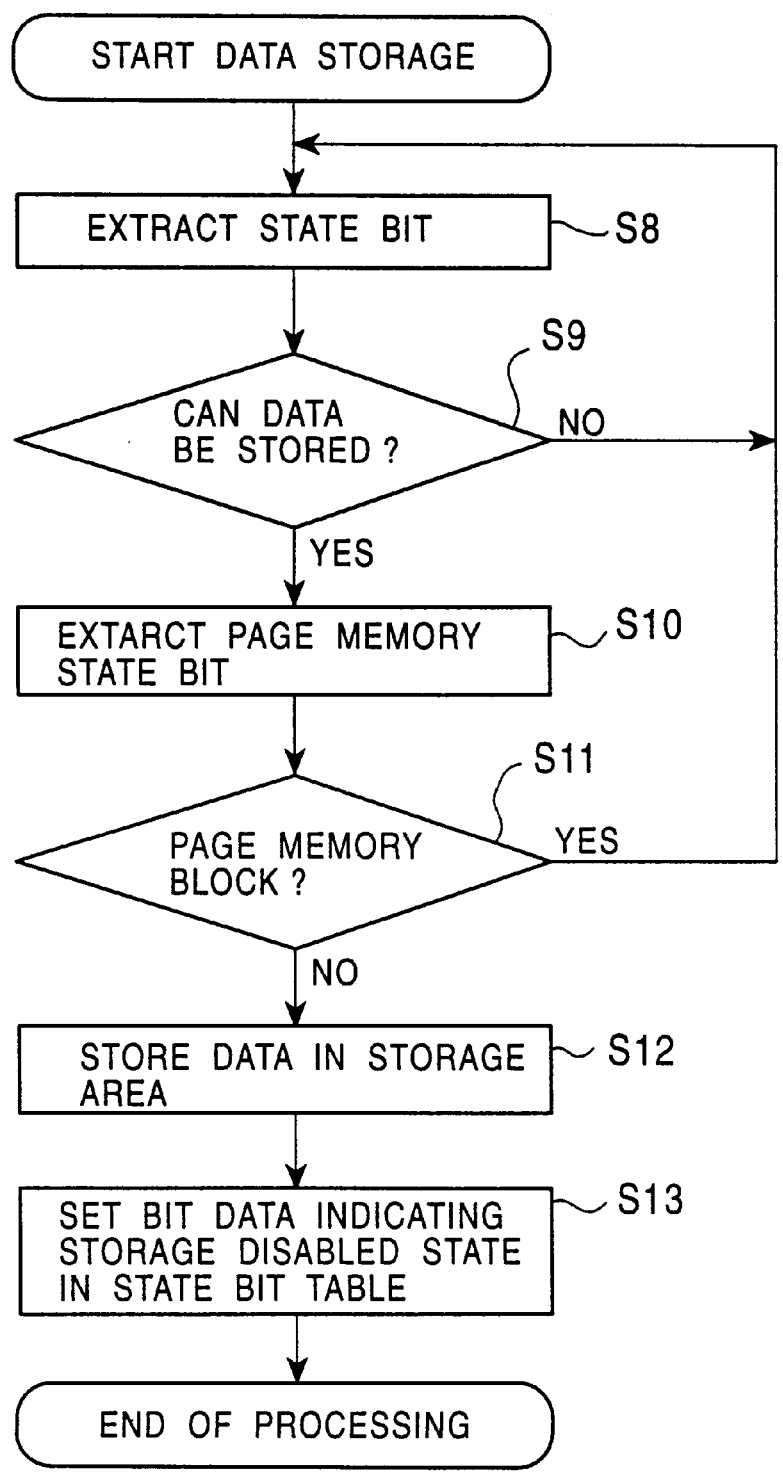
FIG. 12 is a flow chart showing a received data storage procedure in the FM teletext broadcast receiver according to the embodiment.

A page memory management method will be described next with reference to FIGS. 11A and 11B. FIG. 11A is a flow chart showing a page memory registration procedure in the page memory management method, whereas FIG. 11B is a flow chart showing a page memory deletion procedure. FIG. 12 is a flow chart showing a data storage procedure in the page memory management method.

When storage of data in the page memory is requested by the operator, page selection is performed in step S1 in FIG. 11A. The storage block number of the page to be stored in the page memory is extracted from the information table 3 (step S2). The table data of the page to be stored in the page memory is set in the page memory information table 5 (step S3). The flag, in the page memory information bit table 4, which corresponds to the block in which the page data as the page memory data is stored is set (step S4).

When deletion of page data from the page memory is requested by the operator, the page to be deleted from the page memory is selected (step S5 in FIG. 11B). The table data of the page to be deleted is deleted from the page memory information table 5 (step S6), and the flag, in the page memory information bit table 4, which corresponds to the block in which the page data is stored is cleared (step S7).

When received FM teletext broadcast data is to be stored in the data storage area 1, available blocks are searched out from the data storage area 1 on the basis of the state bit table 2 (steps S8 and S9 in FIG. 12). In addition, blocks which are not used as page memory blocks are searched out on the basis of the page memory information bit table 4 (step S10). If the corresponding blocks are available blocks and are not used as page memory blocks (step S11), the procedure for storing the received data in units of blocks is executed (step S12), and each of the corresponding bit data in the state bit table 2 is set in a storage disabled state (step S13).

In this manner, the state bit table 2 is searched to check whether data are stored in the corresponding blocks, and the page memory information bit table 4 is searched to check whether the corresponding blocks are used as page memory blocks. If the corresponding blocks are available blocks and are not used as page memory blocks, the received data are stored in units of blocks, and each of the bit data, in the state bit table 2, which correspond to the blocks in which the data are stored is set in a storage disabled state.

The table data of the received data is formed at the end of the information table 3 (step S17), and the data in the information table 3 are rearranged in a predetermined order (step S18). In this manner, in data storage processing, data are stored after it is checked whether corresponding blocks are set as page memory blocks (steps S10, S11, and S12). For this reason, no received data are stored in blocks set as page memory blocks. In addition, even after a program is complete, or the receiver is powered off, or the FM reception frequency is changed, the page memory function can be realized by holding the contents of the page memory information table 5 and the page memory information bit table 4.

The operation of an embodiment of the present invention has been described in detail above with reference to the accompanying drawings. However, the present invention is not limited to this embodiment, and various changes and modifications can be made without departing from the spirit and scope of the invention.

What is claimed is:

1. An FM teletext broadcast receiver having a page memory function of holding program data and page data upon completion of an FM teletext broadcast program, comprising a data storage system including:

a plurality of data storage areas divided into blocks for storing received data;

a state bit table for storing a state bit indicating whether data has been stored in a corresponding block of said blocks in said data storage areas;

an information table for storing management items for managing program data stored in said data storage areas;

a page memory state bit table for storing a bit data value indicating whether page data in each of said blocks in said data storage areas is held upon completion of a program; and a page memory information table for storing table data of said management items for each block in which the page data is held, wherein a control section for performing a first step of searching said information table to check whether received data of a variable length byte size has already been stored in said data storage areas upon receiving FM teletext broadcast data, a second step of, when it is determined in a step that no data has been stored in said data storage areas, searching said data storage areas for available blocks on the basis of said state bit table, searching for blocks which are not used as page memory blocks on the basis of said page memory state bit table, and storing the received data in units of blocks when the blocks are available blocks, a third step of forming table data of the received data at an end of said information table, and a fourth step of rearranging data in said information table in a predetermined order.

2. A receiver according to claim 1, wherein said control section registers page memory data by performing the first step of selecting page data set as page memory data, the second step of extracting a block number indicating a block, in said data storage area, in which the page data as the page memory data is to be stored, the third step of forming table data of the page data set as the page memory data in said page memory information table, and the fourth step of setting bit data, in said page memory state bit table, which corresponds to the block in which the page data set as the page memory data is stored.

3. An FM teletext broadcast receiver according to claim 1, wherein said control section deletes page memory data by performing a first step of selecting page data to be deleted from a block, in said data storage areas, which is set as a page memory block, a second step of deleting data of the page data to be deleted from said page memory information table, and a third step of clearing bit data, in said page memory state bit table, which corresponds to the block in which the page data to be deleted is stored.

4. An FM teletext broadcast receiver according to claim 1, wherein said page memory state bit table comprises a bit table in which 1-bit data is set for each of the blocks, the 1-bit data being set to "0" or "1" to indicate whether a corresponding block is set as a page memory block.

5. An FM teletext broadcast receiver according to claim 1, wherein the table data in said page memory information table includes a link flag for indicating whether page data set as page memory data includes a plurality of blocks, and a block number.

6. An FM teletext broadcast receiver according to claim 2, wherein said page memory state bit table comprises a bit table in which 1-bit data is set for each of the blocks, the 1-bit data being set to "0" or "1" to indicate whether a corresponding block is set as a page memory block.

7. An FM teletext broadcast receiver according to claim 3, wherein said page memory state bit table comprises a bit table in which 1-bit data is set for each of the blocks, the 1-bit data being set to "0" or "1" to indicate whether a corresponding block is set as a page memory block.

* * * * *